2,509,409

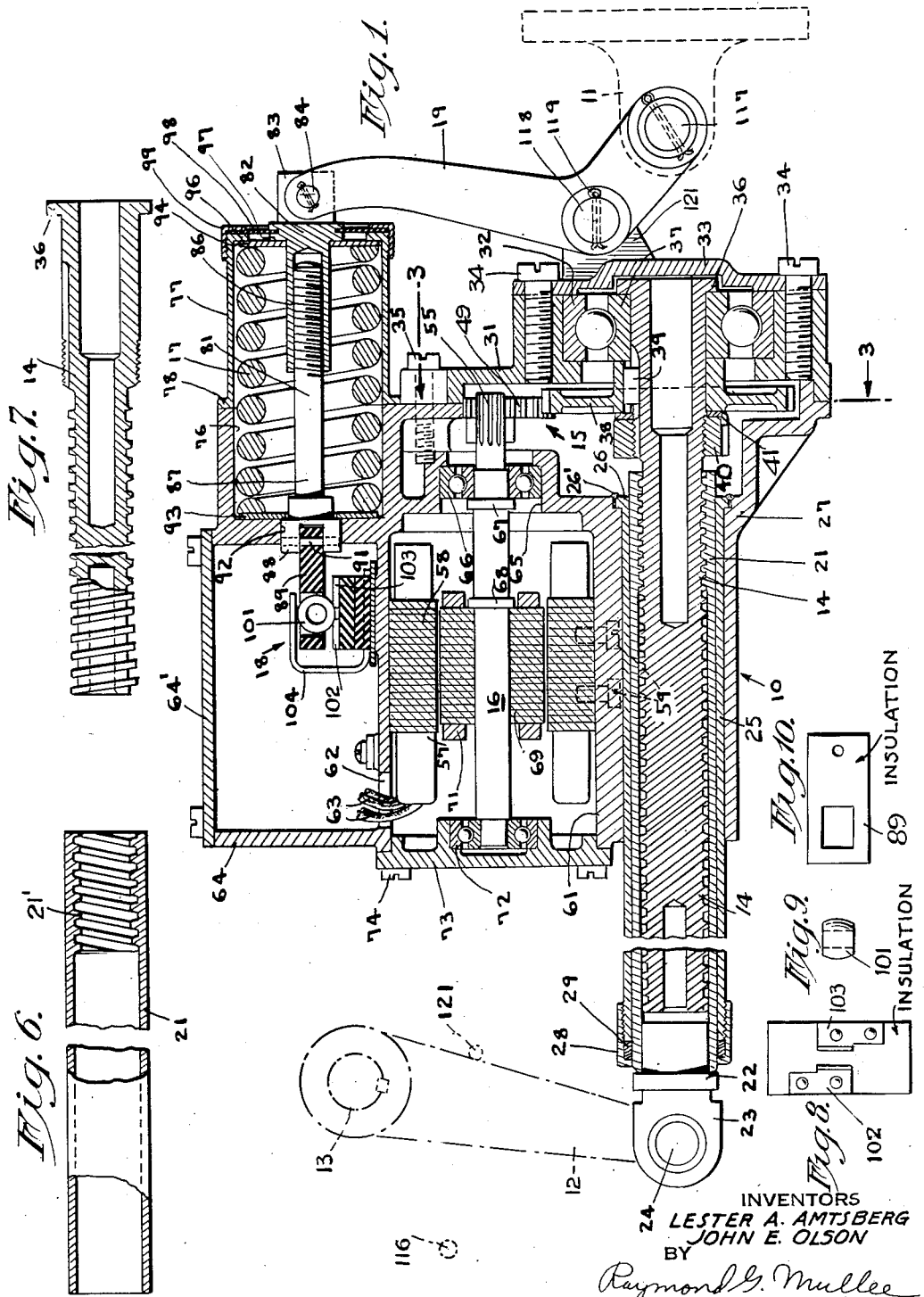

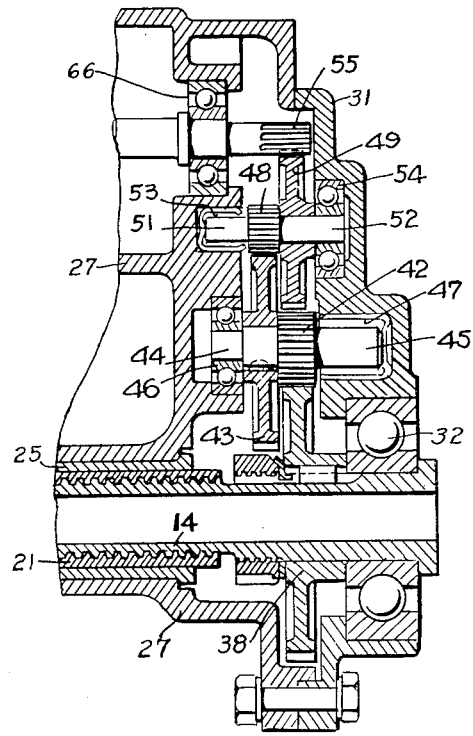
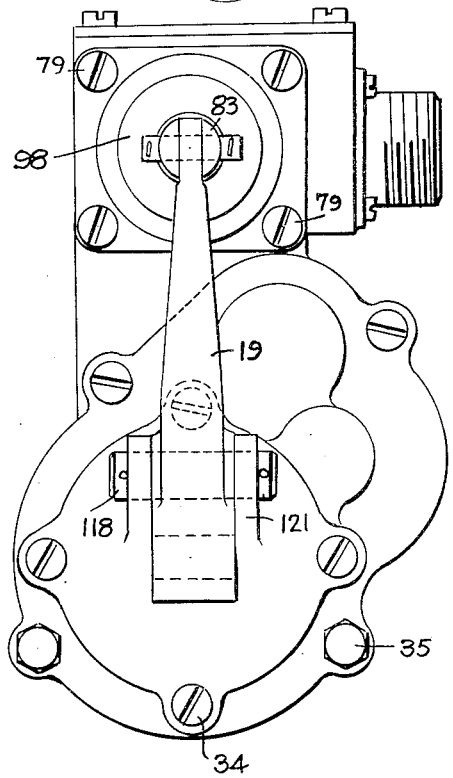
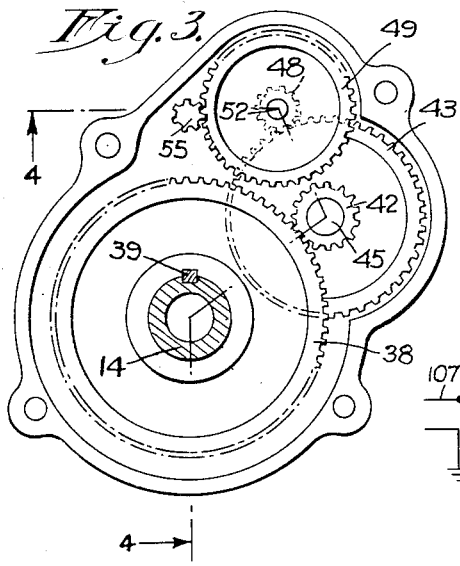
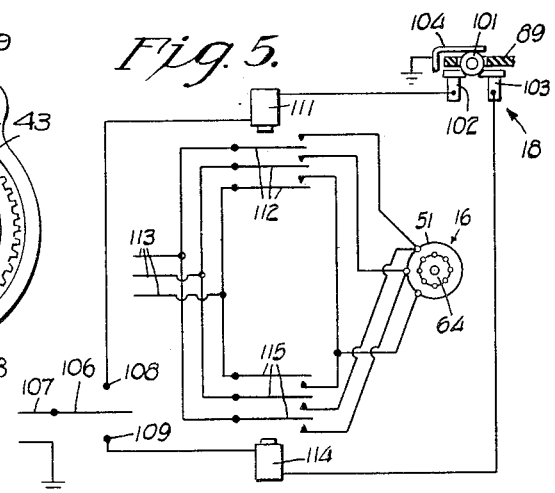
INVENTORS
LESTER A. AMTSBERG
JOHN E. OLSON
BY
Raymond G. Mullee
ATTORNEY Patented May 30, 1950

UNITED STATES PATENT OFFICE 2,509,409

LINEAR ACTUATOR

Lester A. Amtsberg and John E. Olson, Cleveland, Ohio, assignors to Chicago Pneumatic Tool Company, New York, N. Y., a corporation of New Jersey Application July 17, 1945, Serial No. 605,549

9 Claims. (Cl. 192—150)

This invention relates to motor-operated linear actuators, for operating the various control and retractable landing gear parts of an airplane and more particularly to a load-limiting device for opening the motor circuit at the ends of the stroke effected by the actuator.

Heretofore, aircraft actuators have employed a torque limiting device in the gear train which is effective to open the limit switch when a predetermined torque has been reached. Such a device is complicated, subject to maladjustment due to wear of its parts and inherently inaccurate as a measure of the applied force because the gear train torque is affected by variations in the friction on the jack-screw.

It is accordingly among the objects of the present invention to provide a load-limiting device for linear actuators which is simple in construction and not subject to maladjustment due to wear, and which directly measures the axial force within close limits and eliminates errors resulting from jack-screw friction.

According to the invention, a component of the axial force is transmitted to a spring through a pivoted mounting lever. The spring is pre-loaded to resist the component of the normal axial force running through the jack-screw, and, by means of loose plates at the opposite ends of the spring, the spring resists a force in either of two directions. At the end of each stroke, a stop on the airplane abutted by the work member causes the axial force to build up. A part of the reactive force is transmitted through the lever to the spring. When the transmitted part of the force exceeds the pre-load of the spring, the spring is compressed and the motion of an actuating rod within the spring operates the limit switch. The overtravel of the motor is absorbed by the spring. The spring is deflected and axial force is built up slightly above the pre-load value but well within predetermined limits. One advantage of the spring is that it prevent excessive stress from being set up in the linkage operated by the actuator.

A reversible electric motor turns the jack-screw in one direction or the other to extend or withdraw the jack-screw sleeve. Manual switch means is used to select the motor direction of rotation. The limit switch cuts the motor circuit at the ends of the stroke of the jack-screw sleeve or member as it is extended or withdrawn.

For other objects and a better understanding of the invention, reference may be had to the following detailed description taken in connection with the accompanying drawings, in which:

Fig. 1 is a longitudinal section of an actuator embodying the features of the present invention;

Fig. 2 is a rear view, in elevation, of the actuator;

Fig. 3 is a sectional view of the gear reduction portion of the actuator, taken along the line 3—3 of Fig. 1, and with the cover plate thereof removed;

Fig. 4 is a sectional view taken along the line 4—4 of Fig. 3;

Fig. 5 is a wiring diagram of the electric control switches and motor;

Figs. 6 and 7 are respectively fragmentary views, partly in section of the jack-screw sleeve and the jack-screw;

Fig. 8 is a top plan view of the limit switch;

Fig. 9 is an elevational view of a contact roller; and

Fig. 10 is a plan view of the sliding insulating block which carries the contact roller.

Referring now particularly to Fig. 1, 10 is the linear actuator connected between anchor point or bracket 11 and a lever arm 12. The lever arm 12 is splined to a shaft 13 which may be connected to some work element or part of the airplane to be operated by the actuator. The operated part may be some control surface of an airplane or it may be a tail skid or other landing gear.

The actuator 10 comprises generally a jack-screw 14, a gear train 15, an electric motor 16, a pre-loaded spring 17, a limit switch 18, and a pivoted lever 19 for connecting the actuator to the anchor point or bracket 11. The jack-screw 14 operates an internally threaded jack-screw sleeve or member 21 to adjust the sleeve either outwardly or inwardly to lengthen or shorten the over-all longitudinal dimension of the actuator. As shown in Fig. 6, the threaded portion of the sleeve extends only a short distance as shown at 21'. As the jack-screw is turned in one direction the lever arm 12 and shaft 13 are turned through an angle in a corresponding direction, and if the jack-screw is rotated in the opposite direction the lever arm 12 and shaft 13 are turned through an angle in a corresponding opposite direction.

Welded to the outer end of the jack-screw sleeve 21, as indicated at 22, is a connecting head or eye 23. This connecting head 23 is pivotally connected to the lower end of lever arm 12 by a pivot pin 24. Surrounding the adjustable jack-screw sleeve 21 is a jack-screw sleeve guide 25 anchored at its inner end against outward displacement by means of a shoulder 26 to a main housing or casting 27. To prevent inward displacement of the shoulder 26 it is welded to the casting at 26'. This sleeve guide 25 thus remains stationary in the housing 27 as the internally threaded jack-screw sleeve 21 is moved in and out by the jack-screw 14. Threadedly connected to the outer end of the sleeve guide 25 is a retaining cap 28 containing a felt wiper ring 29 serving to wipe the exterior surface of the internally threaded jack-screw sleeve 21.

The main housing 27 is fashioned at one end to contain the reduction gearing 15. Secured to this enlarged end of the main casting 27 is a gear case or cover 31 adapted to contain a ball thrust bearing 32 for supporting the inner end of the jack-screw 14. The thrust bearing 32 is retained in the gear case 31 by an end bracket plate 33 and fastening screws 34. The gear case cover 31 is fastened to the enlarged end of the main casting 27 by bolts 35.

The end of the jack-screw 14 has a shoulder portion 36 cooperating with an inner race 37 of the ball bearing element 32 to prevent its outward axial displacement within the housing 27. A large gear 38 is splined as indicated at 39 to the jack-screw 14 and is retained thereon against the inner race 37 of the ball bearing 32 by a lock nut 40 and lock washer 41. Also, by means of this nut and washer the jack-screw is fixed against inward axial displacement within the housing.

Referring now to Fig. 4, the arrangement of the individual gears of the gear train 15 will be described. Cooperating with the large gear 38 on the jack-screw 14 is a pinion 42 of a combined pinion and large gear 43 connected by shaft projections 44 and 45 respectively to a ball bearing element 46 in the main housing 27 and a roller bearing element 47 in the gear case 31. The gear 43 in turn meshes with a pinion 48 of a combined pinion and gear 49 having shaft projections 51 and 52 journalled respectively in a roller bearing element 53 in the main housing 27 and a ball bearing element 54 in the gear case 31. The large gear 49 is driven from rotor pinion shaft 55 of the electric motor 16. The gear reduction of the gear train is such as to give the desired force and speed to the jack-screw 14.

The electric motor, which is reversible, may be of the 3-phase induction type including stator windings 57 and a laminated stator core 58 secured to the main housing 27 by means of bolts 59. In a commercial embodiment of the invention it has been found desirable to use a squirrel cage motor operating on a frequency of 400 cycles per second and at a synchronous speed of 24,000 R. P. M. The main housing 27 has a housing portion 61 in which the motor parts are housed. Through a side hole opening 62 lead wires 63 from the stator windings 57 may extend into a limit switch housing portion 64 having a cover 64'.

In the inner end of the motor housing portion 61 adjacent the pinion end of shaft 55 is a recess 65 which contains a ball bearing 66 for supporting the pinion end of the rotor shaft 55. The shaft is retained against inward displacement by means of a shoulder portion 67 thereon which abuts the ball bearing 66. Outwardly of the shoulder portion 67 is another shoulder portion 68 against which a rotor core 69 is disposed. This core 69 is in vertical alignment with the stator core 58 to cooperate therewith. A squirrel cage ring 71 is embedded in the rotor core 69. The outer end of the pinion shaft 55 is supported in a ball bearing 72 which is housed in a motor housing cover 73. The cover 73 is secured to the main casting 27 by bolts 74.

The pre-loaded spring or lever retaining means 17 is partly disposed in a recess or housing portion 76 located on the main casting 27 immediately above the gear train 15. Over the outer end of the spring 17 and adapted to hold the spring 17 in its pre-loaded state is a spring retaining cup or case 77 having an outwardly flanged open end 78 adapted to be secured to the main casting 27 and about the recess 76 by fastening screws 79, Fig. 2.

Within the spring 17 is an actuating or push rod 81 for operating the limit switch 18. This actuating rod is of two-part construction so that the length of same may be adjusted to fit the retaining case 77. One part 82 is in the form of a yoke having connecting clevis projection 83. The upper end of the lever 19 is connected to the clevis 83 by pin and cotter means 84. Also, in this yoke part 82 there is formed a threaded recess 86 adapted to adjustably receive a second part 87 of the actuating rod 81. This part 87 is threaded and is adjustable in the threaded recess 86 of the part 82. The part 87 also has clevis portion 88 to which an insulating member 89 is attached by means of a pin 91. The clevis 88 extends through an opening 92 in the bottom of the recess 76 so as to connect with the insulating member 89 within the limit switch housing portion 64.

At the opposite ends of the actuating rod 81 and adapted to respectively engage the ends of the spring 17 are spring plates 93 and 94. The spring plate 93 is normally retained against the bottom of the recess 76 by spring 17 but can be moved outwardly when the actuating rod 81 is moved to the right to compress the spring 17 against the opposite spring plate 94. The outward movement of the plate 93 is effected by the clevis projection 88 of the part 87.

The spring plate 94 is normally retained against outward displacement by an inwardly extending flange 96 on the spring case 77. The spring plate 94 also engages at its inner periphery a shoulder 97 on the actuating rod part 82. This shoulder 97 in addition to holding the plate 94 also retains the inner periphery of a flexible covering diaphragm 98. The outer periphery of the flexible diaphragm 98 is retained against the flange 96 of the spring case 77 by an angular retaining ring 99.

As the actuating rod 81 is moved to the left the spring plate 94 is moved by the shoulder 97 of part 82 away from the inturned flange 96 to force the spring 17 against the bottom of the recess 76. The clevis portion 88 of the part 87 will pass through the plate 93 and move the insulating block 89 to the left.

The insulating block 89 carries a metallic contact roller 101 adapted to normally bridge contact plates 102 and 103. A tensioned spring 104 serves to maintain the contact roller 101 in engagement with one or both of the contact plates 102 and 103 to connect the contact plate or plates through the roller 101 and spring 104 to ground.

Referring now to Fig. 5, there is shown a wiring diagram including the limit switch 18, a manually operated switch arm 106 connected with a direct current source wire 107 and adapted to be connected either to a contact terminal 108 or a terminal 109. When the arm 106 is on the terminal 108, a relay coil 111 is energized. One wire of this relay coil 111 is connected to the contact plate 102 of the limit switch. With the contact roller 101 in the neutral position, bridging the two contact plates 102 and 103, the circuit through the relay 111 will be completed from plate 102, through roller 101 and grounded contact spring 104. The relay 111 operates three relay armatures 112 to establish a circuit from a three-phase power supply 113 with the stator windings 57. This establishes a revolving magnetic field within the stator core 58 so that the motor is rotated in one direction. The motor 16 will continue to operate in this direction until the contact roller 101 leaves the contact plate 102. Whereupon, the direct current relay circuit is disconnected, the armatures 112 are released, and the electric motor 16 is stopped.

If the switch arm 106 is moved to the contact point 109, a relay 114 is energized. A circuit is established through contact plate 103, roller 101 and grounded contact spring 104. A set of relay armatures 115 is operated and the connections with the stator winding 57 are then such that the motor 16 is rotated in the reverse direction. This rotation of the motor will continue until either the switch arm 106 is manually withdrawn from the terminal 109 or until the contact roller 101 is automatically withdrawn from plate 103, whereupon the relay 114 is de-energized.

The jack-screw 14 is thus operated in one direction or the other so as to extend or withdraw the threaded sleeve 21. When the sleeve 21 is moving in extension from the jack-screw 14 in normal operation to actuate the shaft 13 (or when the jack-screw is extending from the sleeve and the normal operation is to reverse the movement of the shaft 13), the pre-loaded spring 17 will offer sufficient resistance to the reactive force transmitted from the jack-screw to maintain in stationary position the main housing 27 and the spring 17 and lever 19 carried by the housing. If the action is to extend the sleeve 21, this movement continues until the work arm 12 engages a stop 116. The jack-screw will continue to rotate but in doing so will be pushed rearwardly from the now stationary internally threaded sleeve 21 thereby to cause lever 19 to be pivoted rearwardly about a pivot pin 117 by which the lever is connected to the anchor bracket 11. The rearward thrust acts upon lever 19 at a point above the pivot pin 117 and through a connection made by a pin 118 and cotter 119 with a bracket 121 on the bracket plate 33.

From the position shown in Fig. 1, the arm 12 and shaft 13 move clockwise and the connecting head 23 moves upwardly as well as to the left. Such upward movement causes the main housing 27, lever 19 and push rod 81 to swing as a unit clockwise about pivot pin 117 on the anchoring bracket 11. As the jack-screw pushes the sleeve 21 forward, it transmits an equal and opposite reaction through lock nut 40, lock washer 41, large gear 36, inner race, balls and outer race of thrust bearing 32, cover plate 33, screws 34, gear case 31, bracket 121, pivot pin 118, lever 19, pivot pin 117 to anchor bracket 11. The backward force transmitted to the anchor bracket 11 is equal and opposite to the force of the connecting head 23 on the lever arm 12. Due to the fact that the pivotal connection 118 of the lever 19 is not in alignment with the jack-screw and pivot pin 117, the reactive force which is transmitted through the lever 19 also has a tendency to rock the lever clockwise about its pivot 118 and exert a pulling force on the actuating rod 81. As has been previously pointed out, the force developed by the jack-screw during normal operation, that is before the shaft 12 is caused to abut the stop 116 during clockwise movement or stop 121 during counter clockwise movement, is insufficient to move the actuating rod 81 relative to the housing 27 due to the pre-compression or loading of spring 17 which resists such relative movement.

In other words, after the sleeve has been extended by the jack-screw to engage stop 116 the jack-screw, as it continues to rotate under the actuation of the motor, will be forced to move to the right carrying with it the entire housing including the pre-loaded spring 17 and the rod 81. It will also carry with it to the right the lever 19 which, it is to be noted, is anchored to the bracket 11. This will cause the lever to turn clockwise about the pivot pin 17 as a fulcrum, and it will also cause the longer arm of the lever to swing to the right at a greater rate than the housing. Accordingly, the lever will exercise a pull on the rod 81, and the arrangement of the members is such that the predetermined pull of the rod will overcome the resistance of the pre-loaded spring to move the rod to the right, thereby actuating the switch.

The amount of the pulling force is considerably less than the force pushing back on the anchor bracket 11 and corresponding to the forward push of the jack-screw. The ratio between the pull of the lever on the actuating rod 81 and the push of the jack-screw may be expressed by the fraction $a/b$, where $a$ is the perpendicular distance between the pivotal connection 118 and the axis of the jack-screw; while $b$ is the distance between the pivotal connection 118 and the axis of the actuating rod 81. It will be noted that in the present illustrative embodiment of the invention the distance $b$ is about four times as large as the distance $a$. Therefore, the lever 19 pulls on the actuating rod 81 with a force which is only about one quarter as much as the pushing force of the jack-screw against the driven object.

The maximum pushing force of the jack-screw can be determined by selecting the desired pre-loading pressure on the spring. If the designer desires to have the motor stop automatically upon attainment of a jack-screw pressure of 1600 pounds, he specifies a spring which may be preloaded to the extent of having an initial compression of 400 pounds. Up to the time that the limit is reached the distances $a$ and $b$ do not vary and the pull of the lever 19 on the actuating rod 81 is an accurate measure of the applied force, being proportional to the pushing force of the jack-screw, irrespective of variations in torque that may be effected by friction. Upon attainment of the predetermined limit, say 1600 pounds on the jack-screw or 400 pounds on the actuating rod 81, the lever 19 starts to move clockwise about its pivotal connection 118, pulling the actuating rod 81 to the right, thereby lifting plate 93 from its seat and compressing spring 17 beyond the pre-loaded force. As soon as movement of the actuating rod 81 begins, the force pulling on the rod tends to increase because the distance $a$ increases thereby affecting the leverage. Almost immediately after the actuating rod starts to move, however, it pulls the insulating block 89 to move the contact roller 101 out of engagement with the contact plate 102 and farther onto the contact plate 103, thereby interrupting the circuit previously established through the contact plate 102. The motor will thereupon be immediately stopped.

If the switch arm 106 is moved to establish a circuit through contact plate 103, the rotation of the motor and jack-screw 14 is in the opposite direction. The pre-loaded spring 17 will return the contact roller 101 to its neutral position in which it bridges the gap between the contact plates 102 and 103 as the motor is rotated again in the opposite direction.

If the motor is rotated so that the jack-screw sleeve 21 is withdrawn, rotation will continue until lever arm 12 reaches its opposite limit position, represented diagrammatically by stop 121. During such rotation the jack-screw 14 will move into the stationary sleeve 21. A reactive force is transmitted through the shoulder 36, thrust bearing 32, housing 27, gear case 31, screws 34, bracket plate 33, bracket 121, pivot pin 118, lever 19, pivot pin 117 and anchor bracket 11. The cycle of operation is similar to the one described above in connection with the forward stroke. At the end of the return stroke and upon the force becoming excessive, the lever 19 is turned counterclockwise about pivot pin 118 on bracket 121. The upper end of the lever 19 will act upon the actuating rod 81 to cause the plate 94 to further compress the pre-loaded spring 17. In doing so the insulating block 89 will carry the contact roller 101 out of contact with plate 103 thereby breaking the circuit which has been established through the contact plate 103 and stopping the motor. The roller 101 is returned to the gap when the motor is rotated in the opposite direction.

It is an essential feature of the invention that the lever 12 pivot about the pivot pin 118 when the housing 27 is moved by the jack-screw 14. In other words, the upper end of the long arm of lever 19 will be moved to the right (Fig. 1) by the moving housing, and simultaneously will be rotated clockwise about the pivot pin 118, which is fixed to the housing by means of bracket 121. By virtue of such movement the rod 81 will be moved toward the right with respect to the housing, thereby actuating the switch member 101 to shut off the motor. In case of movement of the housing to the left the upper end of the long arm of lever 19 will be moved to the left by the moving housing and simultaneously will be rotated about the pivot pin 118, forcing rod 81 to the left with respect to the housing, thus actuating the switch member 101 to shut off the motor.

By arranging the spring to be actuated by a lever instead of simply placing it between the housing 27 and anchor bracket 11, the spring need only sustain a fractional part of the thrust of the jack-screw, whereas, if the spring received the entire force, it would have to be made much larger.

It should now be apparent that there has been provided an actuator of the linear type which is simple in construction, and of compact design, which is not subject to maladjustment due to wear, and which directly measures the axial force within close limits and eliminates errors resulting from jack-screw friction.

While various changes may be made in the detailed construction, it will be understood that such changes will be within the spirit and scope of the present invention as defined by the appended claims.

What is claimed is:

1. A linear actuator comprising a frame, a housing movable in respect to the frame, a member adapted to be extended from and withdrawn into the housing, jack-screw means cooperating with said member to move the same, reversible electric motor means for operating the jack-screw, a bell crank anchored at one point to the frame and pivotally connected at an intermediate point to the housing, an enclosed pre-loaded spring device pivotally connected to the bell crank for maintaining the bell crank immovable with reference to the housing under normal load conditions of the actuator, means on the frame for limiting the extensible movement of the member and adapted upon the continued application of motor power to the jack-screw after the limitation of such extensible movement to cause the jack-screw to move longitudinally away from the member thereby to pivot the bell crank on the frame anchor as a fulcrum and to vary the load of the pre-loaded spring, a limit switch mounted upon the motor and operated by movement of the spring and adapted to shut off the motor upon a predetermined variance of the load of the spring.

2. A linear actuator comprising a frame, a housing movable in respect to the frame, a member adapted to be extended from and withdrawn into the housing, jack-screw means cooperating with said member to move the same, a reversible electric motor means for operating the jack-screw thereby to cause the member to be extended from and withdrawn into the housing, a limit switch controlling the motor, a bell crank pivotally anchored to resisting means on the frame and pivotally connected at an intermediate point to the housing being thereby adapted to rotate about the anchor means and to pivot on the housing upon movement of the housing in respect to the frame, a pre-loaded spring device mounted upon the housing and cooperating at its extremities with the limit switch and the bell crank, said device being adapted to maintain the bell crank stationary with respect to the housing during the movement of extension and withdrawal of the member from and into the housing, means on the frame to limit motion of the extensible member and adapted upon the continued operation of the jack-screw by the motor to cause the jack-screw to move longitudinally carrying the housing therewith thereby pivoting the bell crank on the housing, a rod extending through the spring and movable therewith which is connected at its ends with the limit switch and the bell crank, said rod being adapted upon movement of the bell crank to transmit a predetermined pressure from the bell crank to the limit switch to shut off the motor.

3. In an actuator, a frame, a housing movable with reference thereto, a jack-screw mounted in the housing, a sleeve threadably mounted on the jack-screw and movable axially with reference thereto, a reversible electric motor for effecting relative movement between the jack-screw and sleeve, a limit switch associated with the motor, a spring carried in the housing and preloaded to a predetermined compression, adjustable means on the housing to maintain such spring at predetermined compression, an actuating rod extending through the spring and adapted to operate the limit switch, plates loosely fitted on the rod and at opposite ends of the spring adjacent the spring compression maintaining means, means on the rod adapted upon longitudinal movement of the rod to transmit pressure through the plates to the spring, a lever pivotally mounted on resisting means on the frame and having connections at an intermediate point with the housing and at another point with the actuating rod, means upon the frame limiting the axial movement of the sleeve with reference to the jack-screw and adapted to cause the jack-screw upon its continued rotation in the sleeve after limitation of axial movement of the sleeve to move longitudinally away from such limiting means carrying the housing therewith and causing the lever to pivot and to exercise a predetermined pulling force upon the rod to actuate the limit switch thereby to shut off the motor.

4. An actuator according to claim 3 in which the sleeve is provided with a guide secured to the housing, said guide carrying wiper means for cleaning the sleeve upon its movement in and out of the guide.

5. An actuator according to claim 3 in which the actuating rod is of adjustable length.

6. A linear actuator for use on aircraft comprising relatively movable members, means for connecting the members between a plurality of bodies for imparting relative movement therebetween including in the connection of at least one of the members, a movable third member, means including an enclosed pre-loaded compression spring for restraining the third member against movement during a predetermined range of movement between said relatively movable members but actionable to release the third member for movement when said movable members are actuated to exceed said predetermined range, power means operable for moving the members, and switch means mounted upon the power means and being responsive to the movement of said third member to discontinue operation of said power means.

7. An actuator comprising a housing, a jack-screw mounted in said housing, a sleeve threadably mounted on the jack-screw and movable axially with reference thereto, a reversible electric motor adapted for effecting relative movement between the jack-screw and sleeve, switch means mounted upon the motor, a helical spring carried in said housing, an actuating rod extending through and operatively associated with said spring and movably adapted to operate said switch means, said spring being compressively pre-loaded to restrain movement of said actuating rod until said jack-screw and said sleeve have attained relative movement of a predetermined amount, and a lever pivotally mounted on a fixed support, exterior to said housing and being connected at one point to said housing, and at another point to said actuating rod, all being so arranged that upon attainment of said predetermined amount of relative movement between said jack-screw and said sleeve, an exterior restraining force will become operative so that further action between said jack-screw and said sleeve will cause said spring to be further compressed, resulting in the movement of said actuating rod to operate said switch means to discontinue operation of said motor.

8. A linear actuator comprising a frame, a housing movable in respect to the frame, a member adapted to be extended from and withdrawn into the housing, jack-screw means cooperating with said member to move the same, a reversible electric motor means for operating the jack-screw thereby to cause the member to be extended from and withdrawn into the housing, a limit switch controlling the motor, a lever pivotally anchored to resisting means on the frame and pivotally connected to the housing being thereby adapted to rotate about the anchor means and to pivot on the housing upon movement of the housing in respect to the frame, a pre-loaded spring device mounted upon the housing and cooperating with the limit switch and the lever, said spring device being adapted to maintain the lever stationary with respect to the housing during the movement of extension and withdrawal of the member from and into the housing, means on the frame to limit motion of the extensible member and adapted upon the continued operation of the jack-screw by the motor to cause the jack-screw to move longitudinally carrying the housing therewith thereby pivoting the lever upon the housing, a rod extending through the spring and movable therewith being connected with the limit switch and the lever, said rod being adapted upon movement of the lever to transmit a predetermined movement from the lever to the limit switch to shut off the motor.

9. A linear actuator according to claim 7 wherein said switch means comprises a contact roller, a grounded contact spring, and a pair of contact plates mounted upon a fixed insulation plate, said roller being maintained in a movable insulation member affixed to the actuating rod, and so arranged that in neutral position the roller bridges the contact plates and simultaneously engages the grounded contact spring, and further arranged that in either of two limiting positions of said movable insulation the roller breaks contact with one of the contact plates.

LESTER A. AMTSBERG.
JOHN E. OLSON.

REFERENCES CITED

The following references are of record in the file of this patent:

UNITED STATES PATENTS

| Number | Name | Date |
| --- | --- | --- |
| 1,945,496 | Sloan et al. | Jan. 30, 1934 |
| 2,175,047 | Acker | Oct. 3, 1939 |
| 2,259,437 | Dean | Oct. 21, 1941 |
| 2,317,490 | Simpson | Apr. 27, 1943 |